(12) United States Patent
Tien

(10) Patent No.: US 10,697,841 B2
(45) Date of Patent: Jun. 30, 2020

(54) SYSTEM FOR MEASURING RESIDUAL STRESS IN OPTICAL THIN FILMS IN BOTH TRANSMISSION AND REFLECTION

(71) Applicant: Chuen-Lin Tien, Taichung (TW)

(72) Inventor: Chuen-Lin Tien, Taichung (TW)

(73) Assignee: FENG CHIA UNIVERSITY, Taichung (TW)

( * ) Notice: Subject to any disclaimer, the term of this patent is extended or adjusted under 35 U.S.C. 154(b) by 39 days.

(21) Appl. No.: 16/202,102

(22) Filed: Nov. 28, 2018

(65) Prior Publication Data

US 2020/0166419 A1    May 28, 2020

(51) Int. Cl.
*G01L 1/24*    (2006.01)
*G01B 11/16*   (2006.01)

(52) U.S. Cl.
CPC .............. *G01L 1/24* (2013.01); *G01B 11/161* (2013.01)

(58) Field of Classification Search
CPC ............ G01B 2290/45; G01B 9/02015; G01B 9/02024; G01B 9/02049
See application file for complete search history.

(56) References Cited

U.S. PATENT DOCUMENTS

| 4,195,929 A | * | 4/1980 | Raftopoulos | G01B 11/16 356/32 |
| 4,657,390 A | * | 4/1987 | Doyle | G01J 3/453 356/244 |
| 5,153,675 A | * | 10/1992 | Beauchaine | G01J 3/453 250/339.08 |

* cited by examiner

*Primary Examiner* — Hwa Andrew Lee

(57) ABSTRACT

Conventional optical-transmission-type residual stress measuring apparatus cannot be used for completing the measurement of residual stress in an optical film having light reflective property, and conventional optical-reflection-type residual stress measuring apparatus is known failing to achieving the measurement of residual stress in an optical thin film having transparent or translucent property. In view of that, the present invention discloses a system for measuring residual stress in optical thin films, which is able to be utilized for achieving the residual stress measurement of respective optical thin film having transparent or translucent property and that of respective optical thin film having light reflective property. Therefore, it is helpful for largely reducing both the purchase cost and the maintenance cost by only purchasing the residual stress measuring system provided by the present invention instead of simultaneously purchasing the aforesaid two different types of residual stress measuring apparatuses.

16 Claims, 9 Drawing Sheets

SYSTEM FOR MEASURING RESIDUAL STRESS IN OPTICAL THIN FILMS IN BOTH TRANSMISSION AND REFLECTION

BACKGROUND OF THE INVENTION

1. Field of the Invention

The present invention relates to the technology field of measurement apparatuses of residual stress in thin film materials, and more particularly to a system for measuring residual stress in optical thin films.

2. Description of the Prior Art

Optical film, a dielectric thin film formed on an optical element or a substrate, is adopted for changing transmission characteristics of a light beam through a specific optical effect, such as light reflection, light transmission, light absorption, light scattering, light polarization, and changing the phase of light beam. With the high advancement of optical devices and the popularization of optical products, developments and applications of various optical thin films are becoming more and more important. However, it is found that there is residual stress forming in one optical thin film during the fabrication of the optical thin film on one substrate, such that the fabricated optical thin film may be subject to deformation bending. As a result, production yield of the optical thin film is caused to be lower.

Tensile stress and compressive stress are known two kinds of residual stress in thin film, wherein the presence of tensile residual stress would lead the substrate surface to be concave, and the compressive residual stress forming in the optical thin film would cause the substrate surface be convex. Therefore, it is extrapolated that high-strength residual stress certainly gives rise to a lot of cracks and interstices produced at the interface of the optical thin film and the substrate surface, and more seriously the optical thin film may be peeled off from the substrate surface. Accordingly, how to precisely measure the residual stress in optical thin film has hence become a very important issue for the optical film manufactures.

There are three conventional methods for measuring the residual stress in optical thin films, including: Cantilever beam method, Newton's rings method and laser interferometry method, wherein the laser interferometry method is nowadays implemented in an optical-transmission-type residual stress measuring apparatus and an optical-reflection-type residual stress measuring apparatus. FIG. 1 shows a framework view of the conventional optical-transmission-type residual stress measuring apparatus. From FIG. 1, it is understood that the optical-transmission-type residual stress measuring apparatus 1' comprises: a laser source 10', a collimating lens 11', a beam splitter 12', a reflector plate 13', a reference plate 14, an image capturing module 15', and a controlling and processing module 16'. Moreover, FIG. 1 also illustrates that an first object Tob' having transparent or translucent property is disposed between the beam splitter 12' and the reflector plate 13', and the reference plate 14' is disposed on a piezoelectric transducer (PZT) device 17'. On the other hand, FIG. 2 depicts a framework view of the conventional optical-reflection-type residual stress measuring apparatus. As FIG. 2 shows, the conventional optical-reflection-type residual stress measuring apparatus 2' comprises: a laser source 20', a spatial filter 21', a collimating lens 22', a beam splitter 23', a reference plate 24', a screen 25', an image capturing module 26', and a controlling and processing module 27'. From FIG. 2, it is also found that a second object ob' is disposed on a substrate sb', and the reference plate 24' is disposed on a PZT device 28'.

When applying the laser interferometry method, it generally needs to consider the transmittance and the reflectivity of a specific optical film in advance, and subsequently select and use proper residual stress measuring apparatus to complete the measurement of residual stress in the specific optical film. For instance, the optical-transmission-type residual stress measuring apparatus 1' shown in FIG. 1 is suitable for completing the measurement of residual stress in an optical film having transparent or translucent property. On the contrary, FIG. 2 shows the optical-reflection-type residual stress measuring apparatus 1' suitable for finishing the measurement of residual stress in an optical film having light reflective property. However, for the manufacturers of optical thin films, simultaneously purchasing the aforesaid two different types of residual stress measuring apparatuses certainly causes both the purchase cost and the maintenance cost be largely increased. On the other hand, it is impossible for an academic and research institute or unit to simultaneously purchase the aforesaid two different types of residual stress measuring apparatuses because of the consideration of both the purchase cost and the maintenance cost.

From above descriptions, it is clear that how to make the conventional residual stress measuring apparatus able to be utilized for optionally achieving the residual stress measurement of respective optical film having transparent or translucent property and that of respective optical film having light reflective property has now become an important issue. In view of that, inventors of the present application have made great efforts to make inventive research and eventually provided a system for measuring residual stress in optical thin films.

SUMMARY OF THE INVENTION

Conventional optical-transmission-type residual stress measuring apparatus cannot be used for completing the measurement of residual stress in an optical film having light reflective property, and conventional optical-reflection-type residual stress measuring apparatus is known failing to achieving the measurement of residual stress in an optical film having transparent or translucent property. In view of that, the present invention discloses a system for measuring residual stress in optical thin films, which is able to be utilized for achieving the residual stress measurement of respective optical film having transparent or translucent property and that of respective optical film having light reflective property. Therefore, it is helpful for largely reducing both the purchase cost and the maintenance cost by only purchasing the residual stress measuring system provided by the present invention instead of simultaneously purchasing the aforesaid two different types of residual stress measuring apparatuses.

In order to achieve the primary objective of the present invention, the inventor of the present invention provides an embodiment for the system for measuring residual stress in optical thin films, comprising:

a laser source;

a spatial filter, being configured for receiving a laser beam provided by the laser source, so as to apply a spatial filtering process to the laser beam;

a collimating lens module for converting the laser beam having been treated with the spatial filtering process to a plane-wave laser beam;

a first beam splitter module, being configured for receiving the plane-wave laser beam, and splitting the plane-wave laser beam into an initial reference beam and an initial test beam;

a test plate module for receiving the initial reference beam;

a sample carrying module, being used for carrying and supporting a test sample thereby making the test sample receive the initial test beam; wherein in the case of the test sample having high optical reflective property, the test plate module being configured for reflecting the initial reference beam and passes a first reference beam back to the first beam splitter module, and the test sample also reflecting the initial test beam and passing a first test beam back to the first beam splitter module;

a first screen, wherein the first beam splitter module combines the first test beam and the first reference beam to a first light beam, thereby projecting the first light beam onto the first screen, so as to form a first light interference pattern on the first screen;

a first image capturing module for capturing the first light interference pattern;

a reference plate, wherein in the case of the test sample having high transparent property, the initial test beam would pass through the test sample so as to be received by the reference plate, such that the reference plate reflects the initial test beam;

a second beam splitter module for receiving the second test beam passed from the reference plate; wherein in the case of the test sample having high transparent property, the test plate module being turned by a turning angle, such that the test plate module reflects the initial reference beam and passes a second reference beam to the second beam splitter module;

a second screen, wherein the second beam splitter module combines the second test beam and the second reference beam to a second light beam, thereby projecting the second light beam onto the second screen, so as to form a second light interference pattern on the second screen;

a second image capturing module for capturing the second light interference pattern; and at least one controlling and processing module, being electrically connected to the first image capturing module and the second image capturing module;

wherein the controlling and processing module calculates a first residual stress in the test sample having high optical reflective property by applying a first image processing to the first light interference pattern;

wherein the controlling and processing module calculates a second residual stress in the test sample having high transparent property by applying a second image processing to the first light interference pattern.

In the embodiment of the above-mentioned system, the spatial filter comprises:

a pin hole unit, being disposed at a position of an objective lens focus; and a microscope objective lens unit for focusing the laser beam so as to make the laser beam pass through the pin hole unit.

In the embodiment of the above-mentioned system, the test plate module 17 comprises:

a base;

a supporting post connected to the base by one end thereof; and a test plate, being connected to the other end of the rotary post;

wherein there is a driving mechanism provided in the base for driving the supporting post to rotate the turning angle, so as to make the test plate be turned by the same angle;

wherein a switch unit for triggering the driving mechanism is exposed on the surface of the base.

The embodiment of the above-mentioned system further comprises:

a first linear motion platform for allowing the test plate to be putted thereon; wherein after the first linear motion platform is controlled by the controlling and processing module to execute several times of nanoscale motion, the controlling and processing module obtaining several image frames of the first light interference pattern from the first image capturing module so as to complete the first image processing; and a second linear motion platform for allowing the reference plate to be putted thereon; wherein after the second linear motion platform is controlled by the controlling and processing module to execute several times of nanoscale motion, the controlling and processing module obtaining several image frames of the second light interference pattern from the second image capturing module so as to complete the second image processing;

wherein the controlling and processing module CP completes the first image processing and the second image processing by using a phase-shifting interferometry (PSI) method.

The embodiment of the above-mentioned system further comprises:

a first plane tilting platform for allowing the test plate to be disposed thereon; wherein after the first plane tilting platform is controlled by the controlling and processing module to apply at least one time of plane tilting process to the test plate, the controlling and processing module obtaining corresponding image frames of the first light interference pattern from the first image capturing module so as to complete the first image processing; and a second plane tilting platform for allowing the reference plate to be disposed thereon; wherein after the second plane tilting platform is controlled by the controlling and processing module to apply at least one time of plane tilting process to the reference plate, the controlling and processing module obtaining corresponding image frames of the second light interference pattern from the second image capturing module so as to achieve the second image processing;

wherein the controlling and processing module completes the first image processing and the second image processing by using a Fast Fourier transform (FFT) method.

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE PREFERRED EMBODIMENTS

To more clearly describe a system for measuring residual stress in optical thin films disclosed by the present invention, embodiments of the present invention will be described in detail with reference to the attached drawings hereinafter.

First Embodiment

Figure 1:
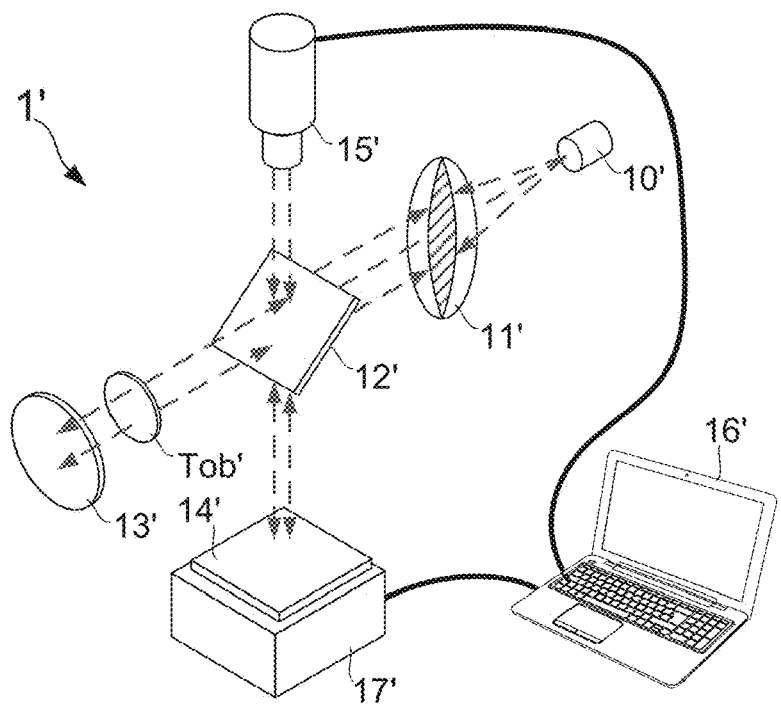
FIG. 1 shows a framework view of the conventional optical-transmission-type residual stress measuring apparatus.
Figure 2:
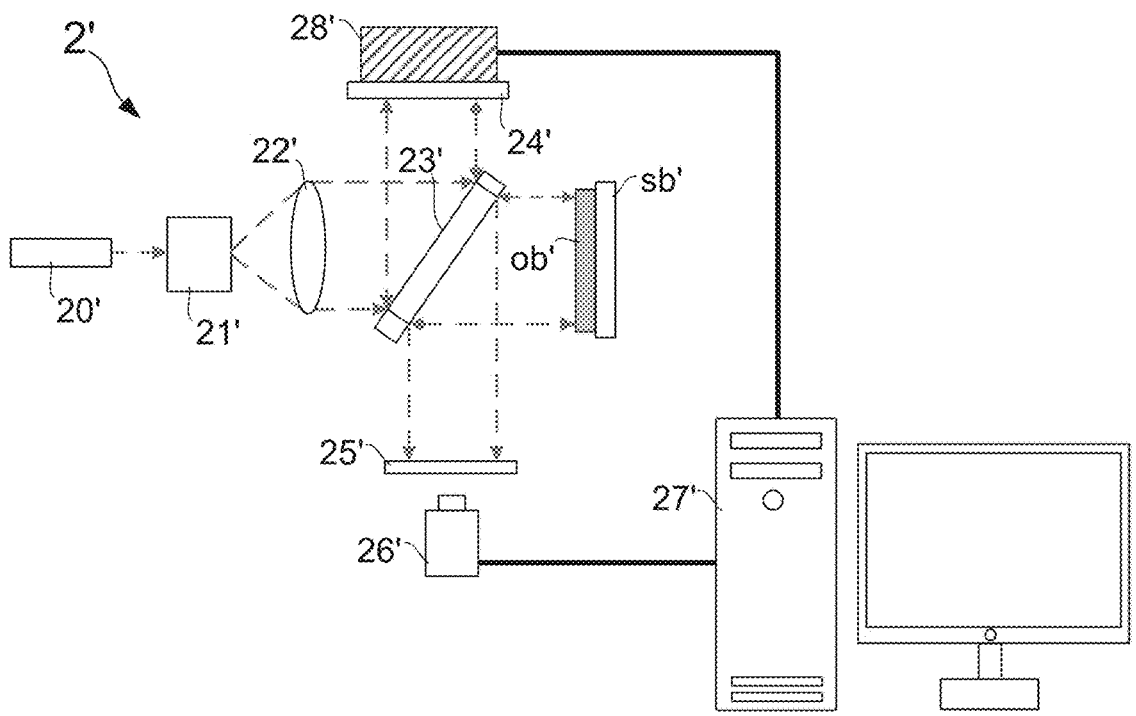
FIG. 2 shows a framework view of the conventional optical-reflection-type residual stress measuring apparatus.
Figure 3A:
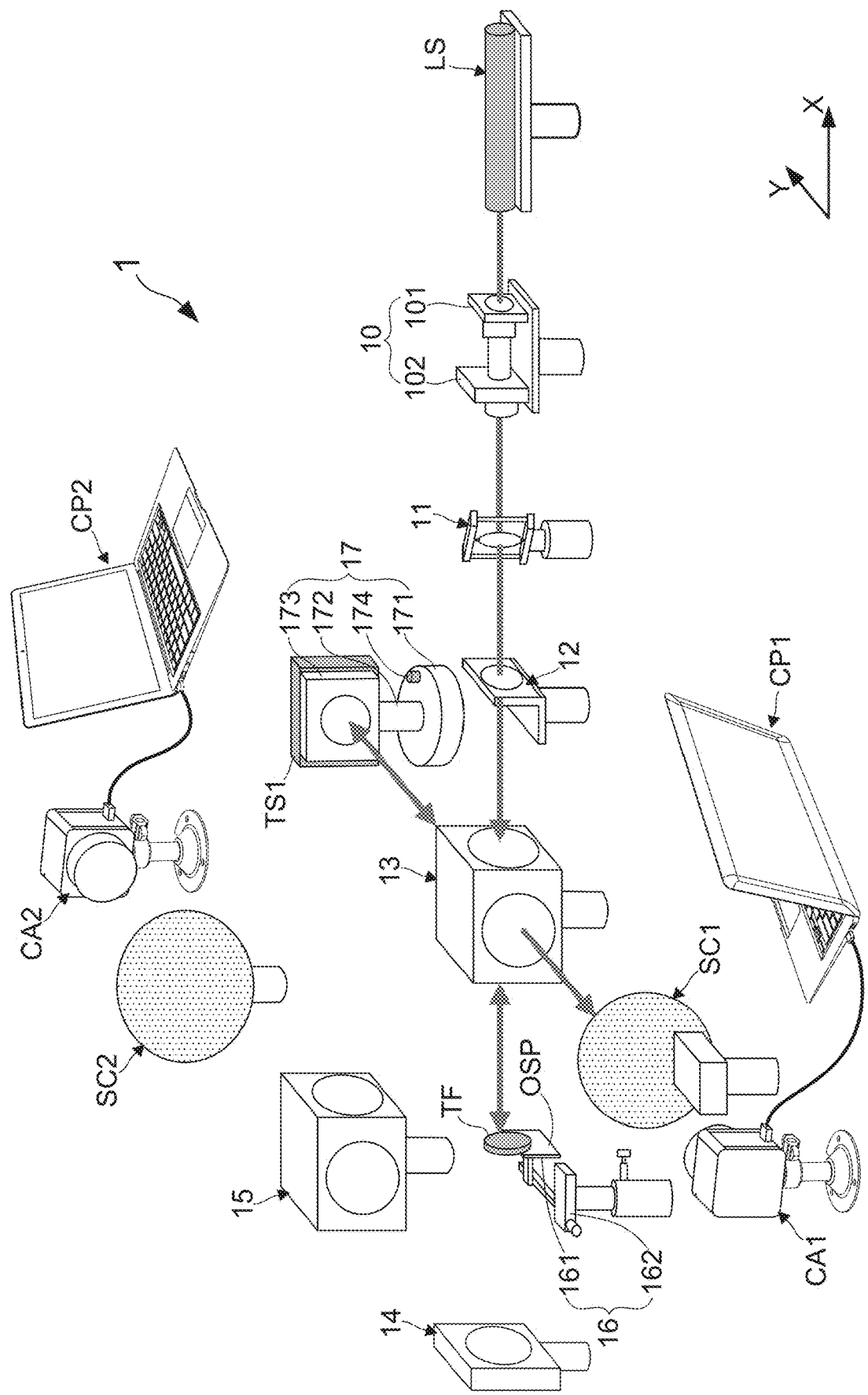
FIG. 3A shows a first framework view of a system for measuring residual stress in optical thin films according to the present invention.
Figure 3B:
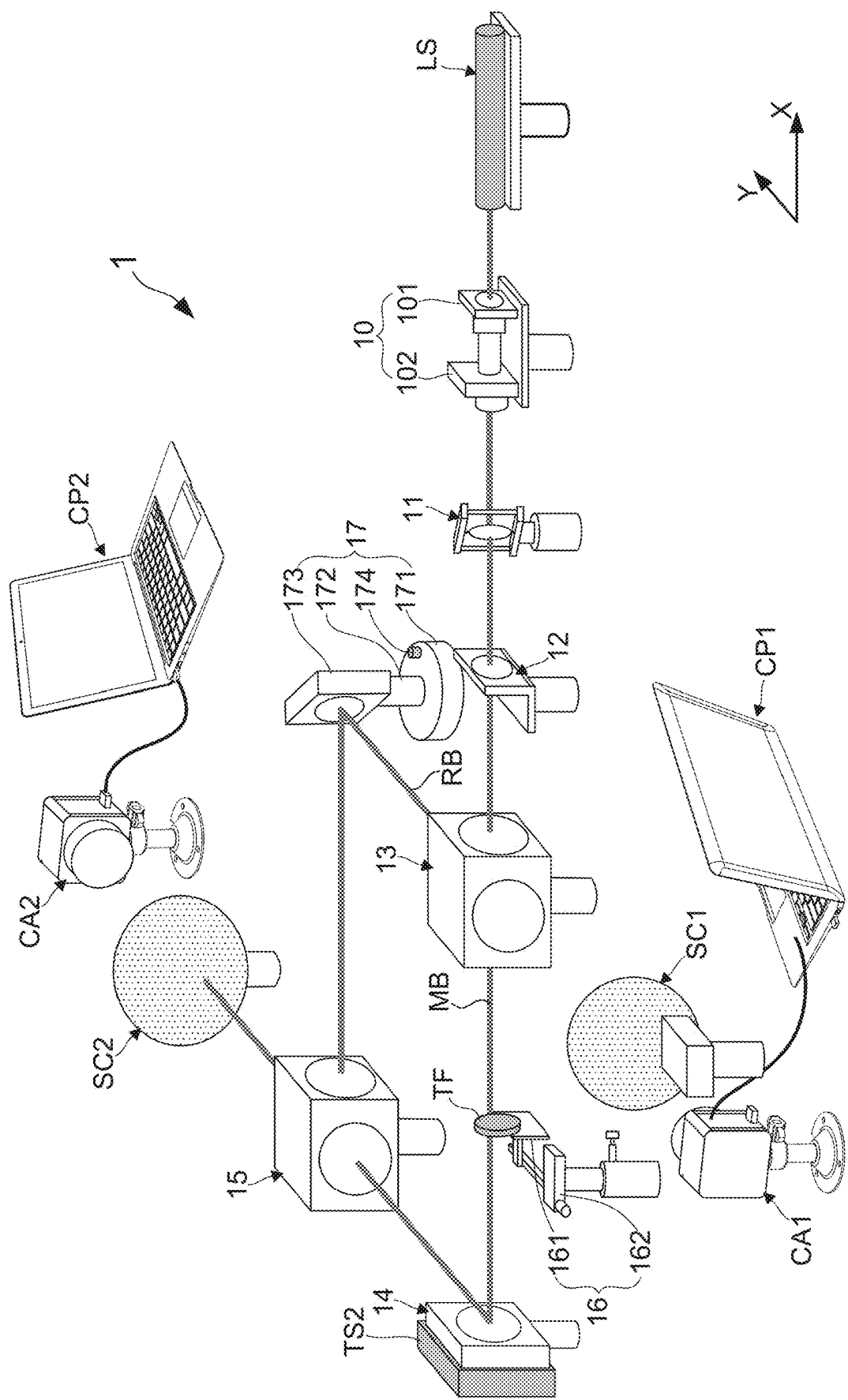
FIG. 3B shows the first framework view of the system for measuring residual stress in optical thin films.

With reference to FIGS. 3A and 3B, there are provided framework views of a system for measuring residual stress in optical thin films according to the present invention. As FIG. 3A shows, the residual stress measuring system 1 proposed by the present invention comprises: a laser source LS, a spatial filter 10, a collimating lens module 11, an aperture module 12, a first beam splitter module 13, a test plate module 17, a sample carrying module 16, a first screen SC1, a first image capturing module CAL a reference plate 14, a second beam splitter module 15, a second screen SC2, a second image capturing module CA2, a first controlling and processing module CP1, and a second controlling and processing module CP2.

Following on from the previous descriptions, the laser source is a helium-neon laser device, which is provided herein for emitting a laser beam. Moreover, the spatial filter 10 is configured for receiving the laser beam and subsequently applying a spatial filtering process to the laser beam. FIG. 3A depicts that the spatial filter 10 comprises a pin hole unit 102 and a microscope objective lens unit 101, wherein the pin hole unit 102 is disposed at a position of an objective lens focus, and the microscope objective lens unit 101 is used for focusing the laser beam so as to make the laser beam pass through the pin hole unit 102. On the other hand, the collimating lens module 11, comprising a double convex lens, or a plano-convex lens, is adopted herein for converting the laser beam having been treated with the spatial filtering process to a plane-wave laser beam. From FIG. 3A, it is understood that the aperture module 12 is arranged in the framework of the residual stress measuring system 1 for applying a beam shaping process to the plane-wave laser beam. Therefore, the plane-wave laser beam having been treated with the beam shaping process passes to the first beam splitter module 13, such that the splitting the plane-wave laser beam into an initial reference beam and an initial test beam, so as to make the test plate module 17 receive the initial reference beam.

According to the particularly design of the present invention, the test plate module 17 comprises: a base 171, a supporting post 172 connected to the base 171 by one end thereof, and a test plate 173 connected to the other end of the supporting post 172. It needs to further explain that, there is a driving mechanism (not shown) provided in the base 171 for driving the supporting post 172 to rotate a specific turning angle (such as 45 degree), so as to make the test plate 173 be turned by the same angle. In addition, a switch unit 174 for triggering the driving mechanism is exposed on the surface of the base 171. Particularly, FIG. 3A depicts that the test plate 173 and an X-axis have an included angle of 0 degree in the case of the fact that test plate 173 is set to be at first state. On the other hand, the sample carrying module 16 is arranged in this residual stress measuring system 1 for carrying and supporting a test sample TS, so as to make the test sample TS face the first beam splitter module 13 for receiving the initial test beam. It is worth noting that, in the case of the test sample TS having high optical reflective property, the test plate module 17 is set to be the aforesaid first state, such that the test plate module 17 is configured for reflecting the initial reference beam and passes a first reference beam back to the first beam splitter module 13. Therefore, from FIG. 3A, it is understood that, the test sample TS also reflects the initial test beam and passing a first test beam back to the first beam splitter module 13.

Furthermore, the first beam splitter module 13 combines the first test beam and the first reference beam to a first light beam, thereby projecting the first light beam onto the first screen SC1, such that a first light interference pattern is formed on the first screen SC1. It is extrapolated that, the first image capturing module CA1 is adopted for capturing the first light interference pattern, therefore the first controlling and processing module CP1 is able to calculate a first residual stress in the test sample TS having high optical reflective property by applying a first image processing to the first light interference pattern. In the residual stress measuring system 1, the first image capturing module CA1 is a camera device using charge-coupled device (CCD) image sensors. In addition, the first screen SC1 is a ground glass driven by a DC motor to rotate, wherein making the first screen SC1 to continuously rotate is helpful for average filtering the speckles contained in the first light interference pattern.

On the contrary, however, in the case of the test sample TS having high transparent property, the test plate module 17 must be set to be a second state by pressing the switch unit 174 for triggering the driving mechanism to turn the test plate 173 by the specific turning angle (i.e., 45 degree). As FIG. 3B shows, after the test plate module 17 is switched from the first state to the second state, the test plate module 17 reflects the initial reference beam and passes a second reference beam to the second beam splitter module 15. Simultaneously, the initial test beam outputted by the first beam splitter module 13 would pass through the test sample TS having high transparent property, so as to be subsequently received by the reference plate 14. From FIG. 3B, it is understood that the reference plate 14 reflects the initial test beam and then passes a second test beam to the second beam splitter module 15. Therefore, the second beam splitter module 15 combines the second test beam and the second reference beam to a second light beam, thereby projecting the second light beam onto the second screen SC2, so as to form a second light interference pattern on the second screen SC2. It is extrapolated that, the second image capturing module CA2 is adopted for capturing the second light interference pattern, therefore the second controlling and processing module CP2 is able to calculate a second residual stress in the test sample TS having high transparent property by applying a second image processing to the second light interference pattern. In the residual stress measuring system 1, the second image capturing module CA2 is a camera device using charge-coupled device (CCD) image sensors. In addition, the second screen SC2 is a ground glass driven by DC motor to rotate, wherein making the second screen SC2 to continuously rotate is helpful for average filtering the speckles contained in the second light interference pattern.

The present invention does not particularly limit the method utilized for helping the controlling and processing modules (CP1,CP2) to complete the first image processing and the second image processing. As FIG. 3A and FIG. 3B show, there is a first plane tilting platform TS1 arranged in the residual stress measuring system 1 for allowing the test plate 173 to be disposed thereon. Engineers skilled in the technology of residual stress measurement should know that, after the first plane tilting platform TS1 is controlled by the controlling and processing module CP to apply at least one time of plane tilting process to the test plate 173, the controlling and processing module CP obtaining corresponding image frames of the first light interference pattern from the first image capturing module CA1 so as to complete the first image processing by using a Fast Fourier transform (FFT) method. Consequently, the first controlling and processing module CP1 is able to eventually calculate the value of the residual stress in the optical thin film by using curvature method. Detail executing steps of the use of the curvature method have been disclosed by Taiwan Utility Patent No. M552096.

In a similar way, a second plane tilting platform TS2 is arranged in the residual stress measuring system 1 for allowing the reference plate 14 to be disposed thereon. By such arrangement, after the second plane tilting platform TS2 is controlled by the second controlling and processing module CP2 to apply at least one time of plane tilting process to the reference plate 14, the second controlling and processing module CP2 obtains corresponding image frames of the second light interference pattern from the second image capturing module CA2 so as to achieve the second image processing. Herein, it needs to further explain that, the said FFT method can be provided in a main processor of the controlling and processing modules (CP1, CP2) by a form of application program, library, variables, or operands. Moreover, the said controlling and processing modules (CP1, CP2) does not limited to be laptop computer (as shown in FIG. 3A and FIG. 3B), it should be known that the controlling and processing modules (CP1, CP2) can also be desk computer, laptop computer, or smart phone.

Second Embodiment

Figure 4A:
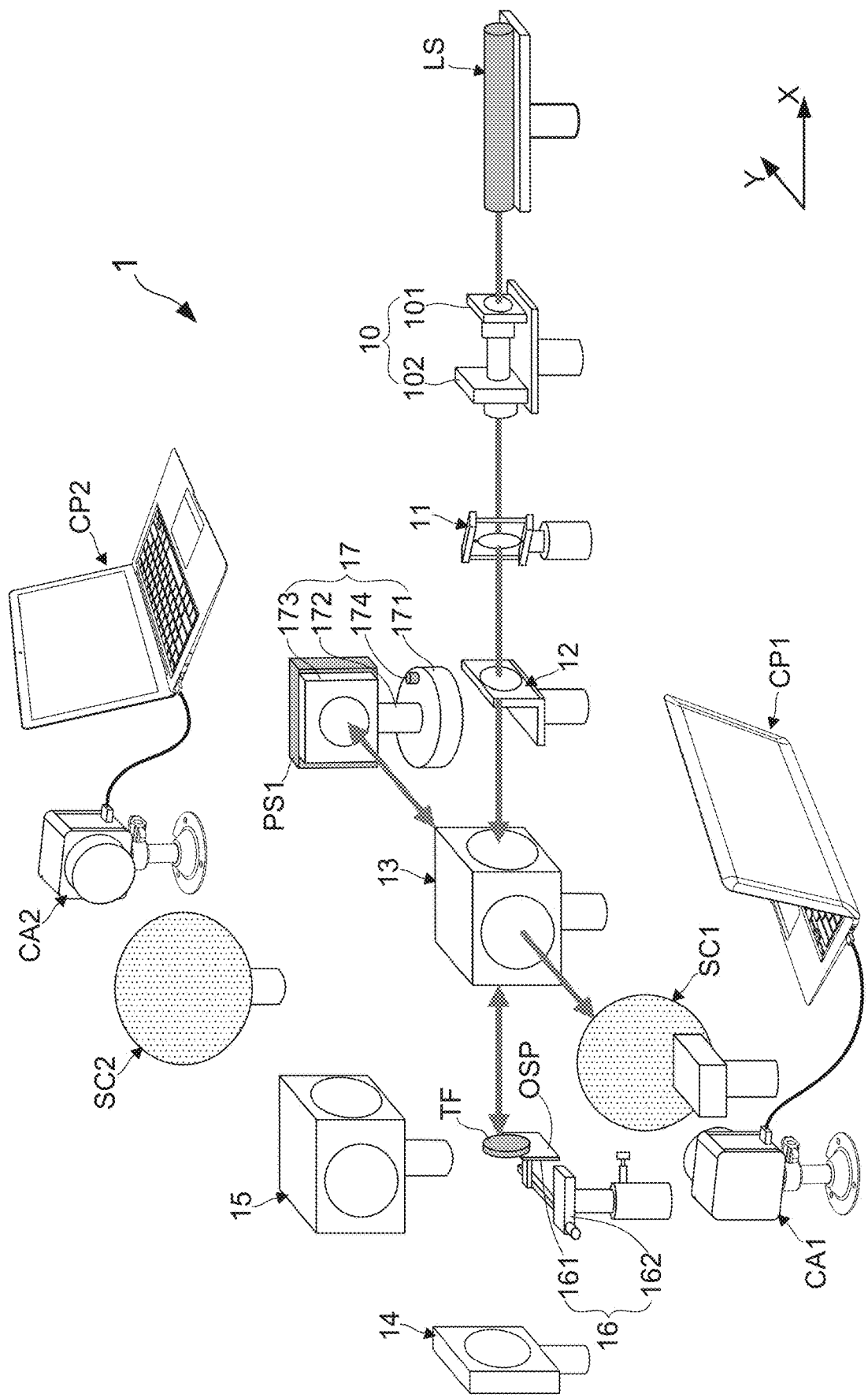
FIG. 4A shows a second framework view of the system for measuring residual stress in optical thin films according to the present invention.
Figure 4B:
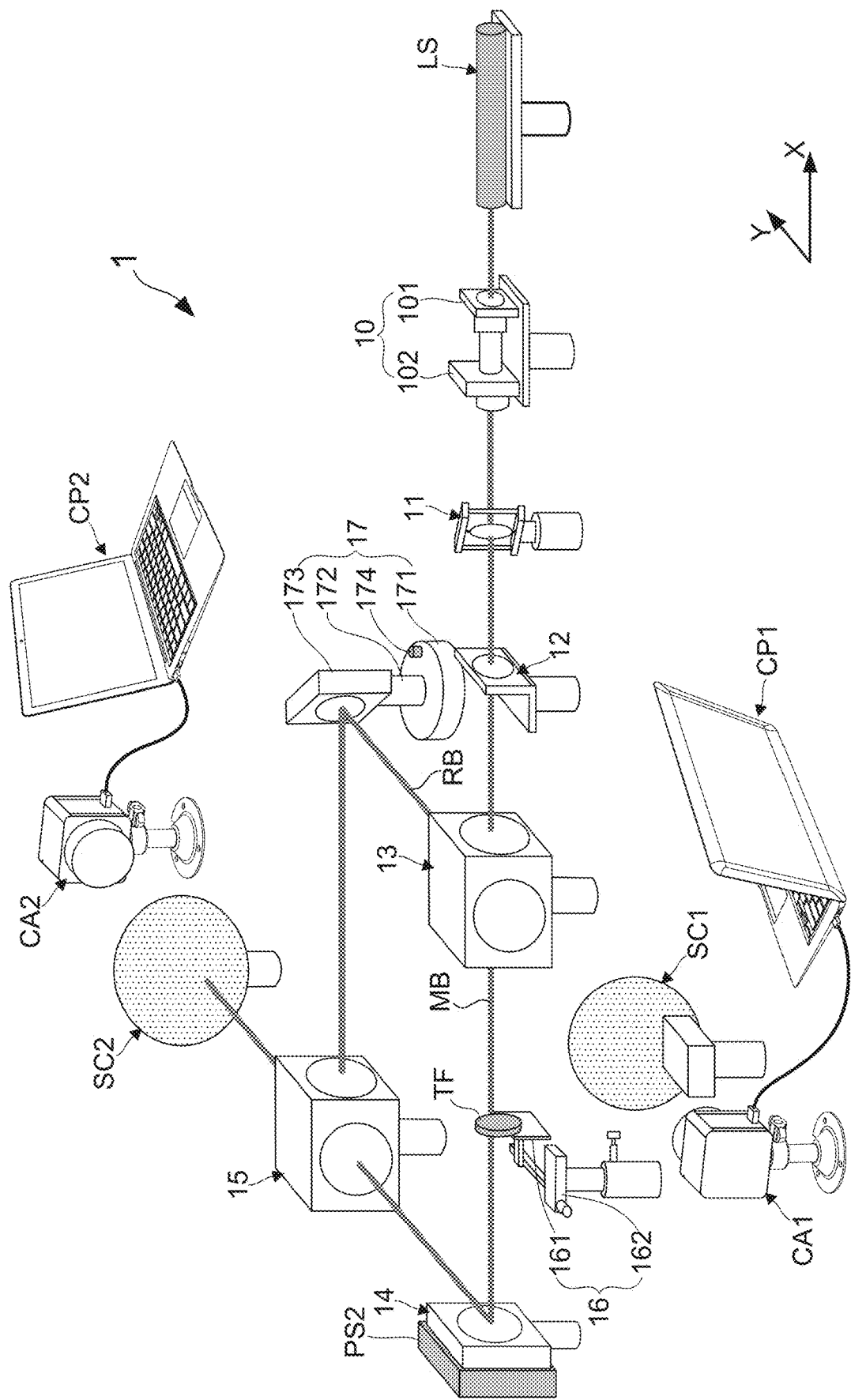
FIG. 4B shows the second framework view of the system for measuring residual stress in optical thin films.

With reference to FIGS. 4A and 4B, there are provided framework views of the system for measuring residual stress in optical thin films according to the present invention. According to the second embodiment, the residual stress measuring system 2 proposed by the present invention also comprises: a laser source LS, a spatial filter 10, a collimating lens module 11, an aperture module 12, a first beam splitter module 13, a test plate module 17, a sample carrying module 16, a first screen SC1, a first image capturing module CAL a reference plate 14, a second beam splitter module 15, a second screen SC2, a second image capturing module CA2, a first controlling and processing module CP1, and a second controlling and processing module CP2. Differing from the above-described first embodiment, a first linear motion platform PS1 using piezoelectric transducer (PZT) device is arranged in the second embodiment for allowing the test plate 173 to be putted thereon. After the first linear motion platform PS1 is controlled by the first controlling and processing module CP1 to execute several times of nanoscale motion, the first controlling and processing module CP1 obtains several image frames of the first light interference pattern from the first image capturing module CA1 so as to complete the first image processing by using phase-shifting interferometry (PSI) method. Similarly, a second linear motion platform PS2 is also provide for allowing the reference plate 14 to be putted thereon. After the second linear motion platform PS2 is controlled by the second controlling and processing module CP2 to execute several times of nanoscale motion, the second controlling and processing module CP2 obtains several image frames of the second light interference pattern from the second image capturing module CA2 so as to achieve the second image processing. Particularly, the said PSI method can be provided in a main processor of the controlling and processing modules (CP1, CP2) by a form of application program, library, variables, or operands.

Moreover, FIG. 3A, FIG. 3B, FIG. 4A, and FIG. 4B also depict that the sample carrying module 16 comprises a sample carrying unit 161 and a supporting unit 162, wherein the sample carrying unit 161 is adopted for carrying the test sample TS, and the supporting unit 162 supports the sample carrying unit 161. It is extrapolated that, the sample carrying module 16 can be designed to a robotic arm, so as to make the residual stress measuring able to automatically taking and carrying the test sample TS for complete an automatic residual stress measuring procedure. During the execution of the automatic residual stress measuring procedure, the system would automatically switch the state of the test plate module 17 in the case of the fact that the first or second light interference pattern shows a poor image contrast. For instance, after the system as shown in FIG. 3A or FIG. 4A is used to obtain one light interference pattern showing poor image contrast, the system would know that the sample under test is a test sample TS having high transparent property. In the meantime, the system would immediately switch the test plate module 17 from a first state to a second state. On the other hand, after the system as shown in FIG. 3B or FIG. 4B is used to obtain one light interference pattern showing poor image contrast, the system would know that the sample under test is a test sample TS having high optical reflective property, and meanwhile the system would immediately switch the test plate module 17 from the second state back to the first state.

Experiment

Figure 5A:
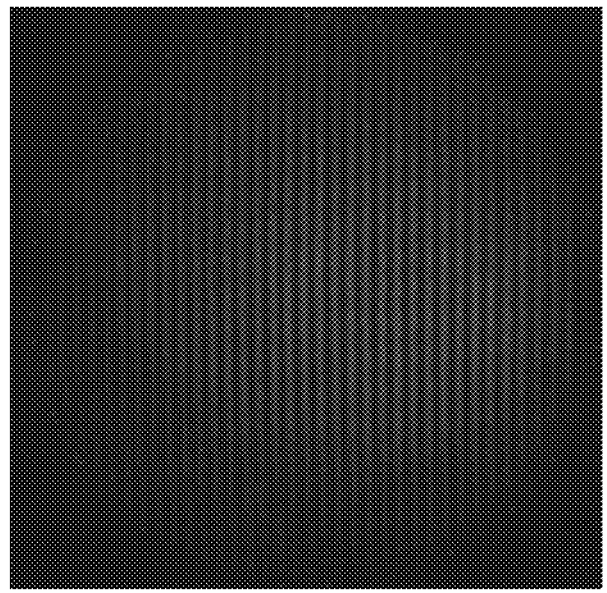
FIG. 5A shows an image diagram of a first light interference pattern of an ITO thin film.
Figure 5B:
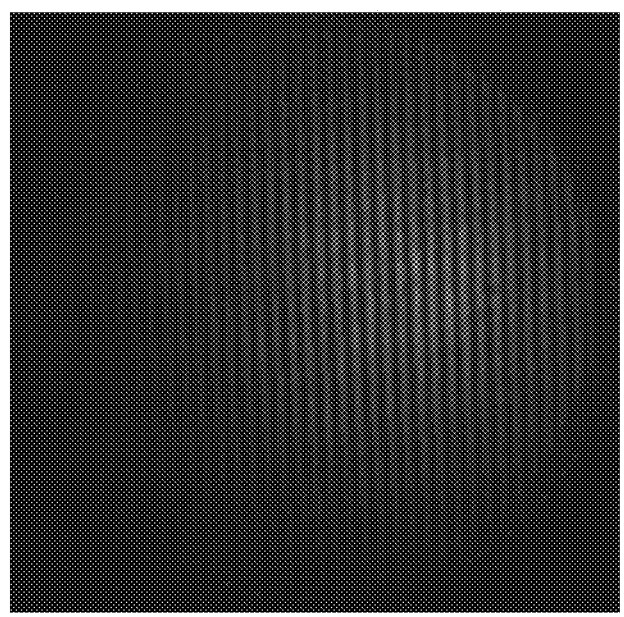
FIG. 5B shows an image diagram of a second light interference pattern of an $MgF_2$ thin film.

Inventors of the present invention have used this residual stress measuring system 1 to complete the residual stress measurement of an ITO thin film and an $MgF_2$ thin film. Particularly, the residual stress measuring system 1 is set to be the first state shown as FIG. 3A for measuring the ITO thin film because of the high optical reflective property of the ITO thin film. On the contrary, before measuring the $MgF_2$ thin film, the residual stress measuring system 1 must be switched back to the second state shown as FIG. 3B. FIG. 5A shows an image diagram of a first light interference pattern of the ITO thin film, and FIG. 5B shows an image diagram of a second light interference pattern of the MgF$_2$ thin film. From FIG. 5A, it is found that the image of the first light interference pattern shows a good image contrast. Moreover, the image of the second light interference pattern in FIG. 5B also exhibits a good image contrast.

After using the system of FIG. 3A to obtain the first light interference pattern of the ITO thin film as well as a light interference pattern of a substrate coated with the ITO thin film, FFT method is subsequently adopted for completing the image process of the first light interference pattern and the light interference pattern. Thus, it is able to establish one 3-D surface profile contour graph (shown as FIG. 6A) of the substrate and another one 3-D surface profile contour graph (shown as FIG. 6B) of the ITO thin film. Consequently, the first controlling and processing module CP1 is able to eventually calculate the value of the residual stress in the optical thin film by using curvature method. Related experimental data is integrated in following Table (1).

TABLE (1)

Figure 6A:
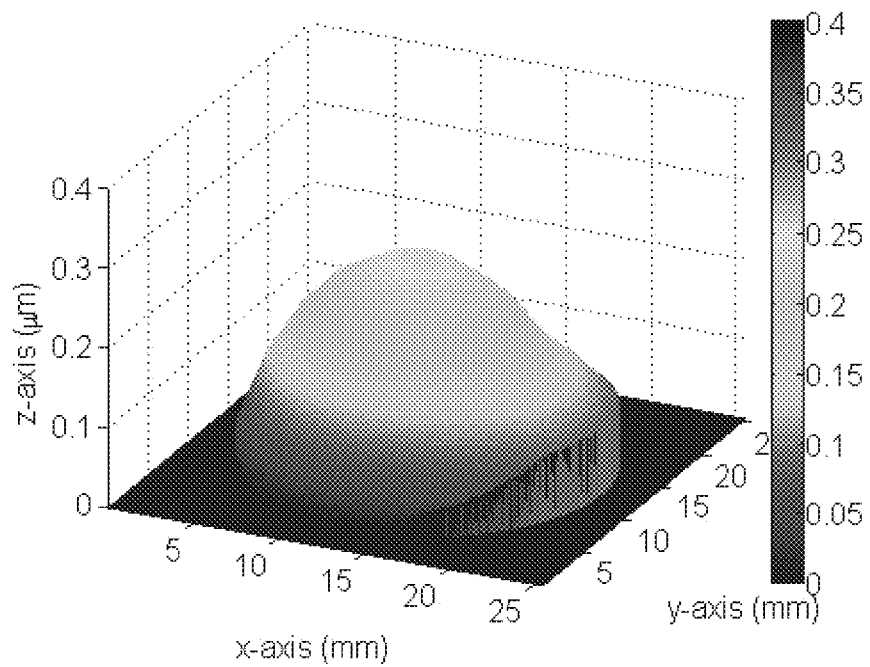
FIG. 6A shows a 3-D surface profile contour graph of one substrate.
Figure 6B:
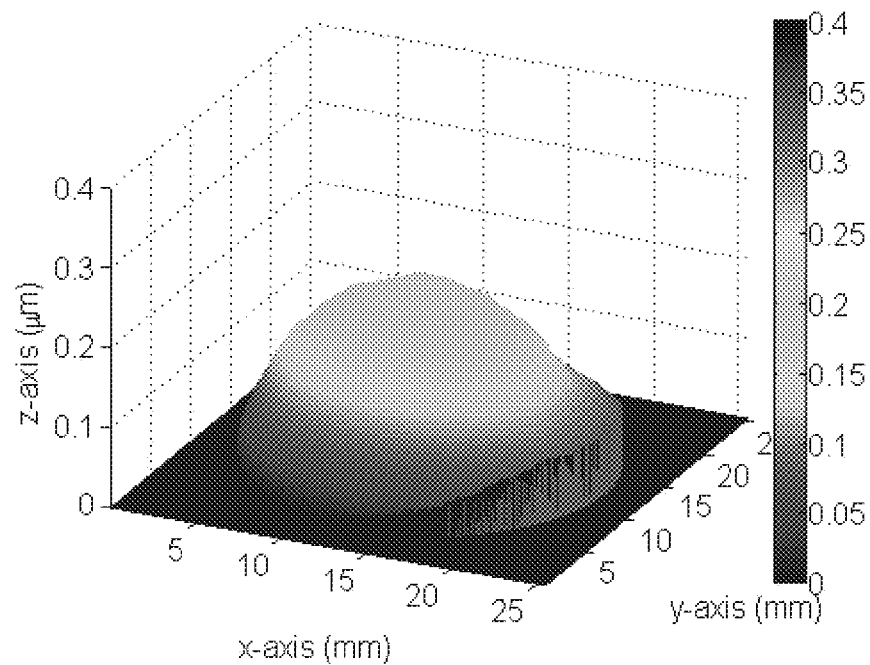
FIG. 6B shows a 3-D surface profile contour graph of the ITO thin film formed on the surface of the substrate.

| Curvature radius calculated based on the 3-D surface profile contour graph of FIG. 6A (m) | Curvature radius calculated based on the 3-D surface profile contour graph of FIG. 6B (m) | Residual stress in the optical (ITO) thin film (GPa) |
|---|---|---|
| −285.563 ± 8.790 | −240.665 ± 2.196 | 0.363 ± 0.034 |

On the other hand, after using the system of FIG. 3B to obtain the second light interference pattern of the MgF$_2$ thin film as well as a light interference pattern of a substrate coated with the MgF$_2$ thin film, FFT method is subsequently adopted for completing the image process of the second light interference pattern and the light interference pattern. Thus, it is able to establish one 3-D surface profile contour graph (shown as FIG. 7A) of the substrate and another one 3-D surface profile contour graph (shown as FIG. 7B) of the MgF$_2$ thin film. Consequently, the second controlling and processing module CP2 is able to eventually calculate the value of the residual stress in the optical thin film by using curvature method. Related experimental data is integrated in following Table (2).

TABLE (2)

Figure 7A:
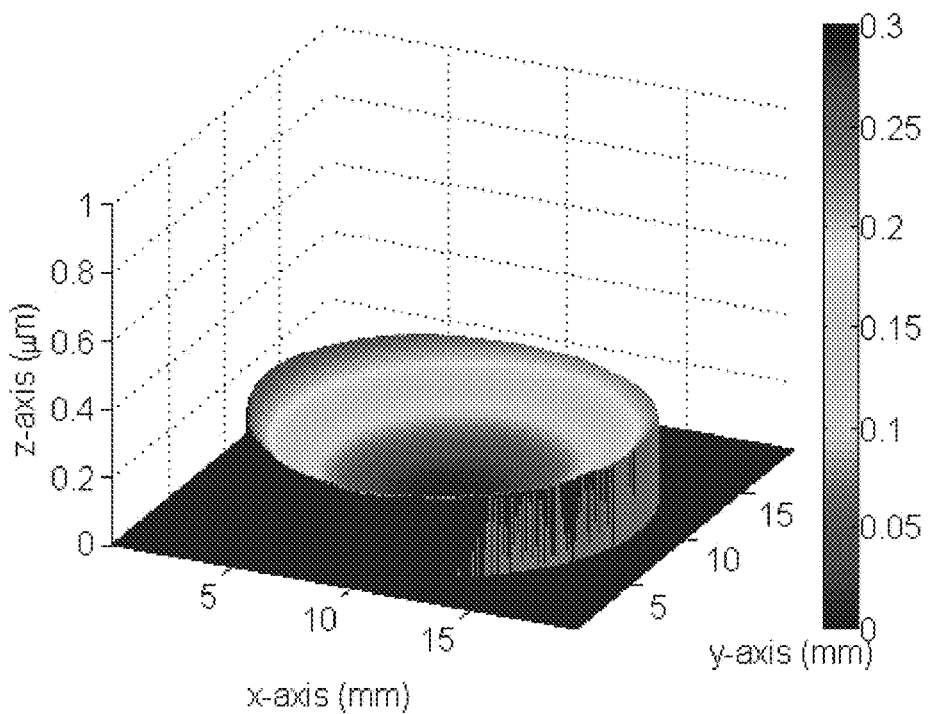
FIG. 7A shows a 3-D surface profile contour graph of another one substrate.
Figure 7B:
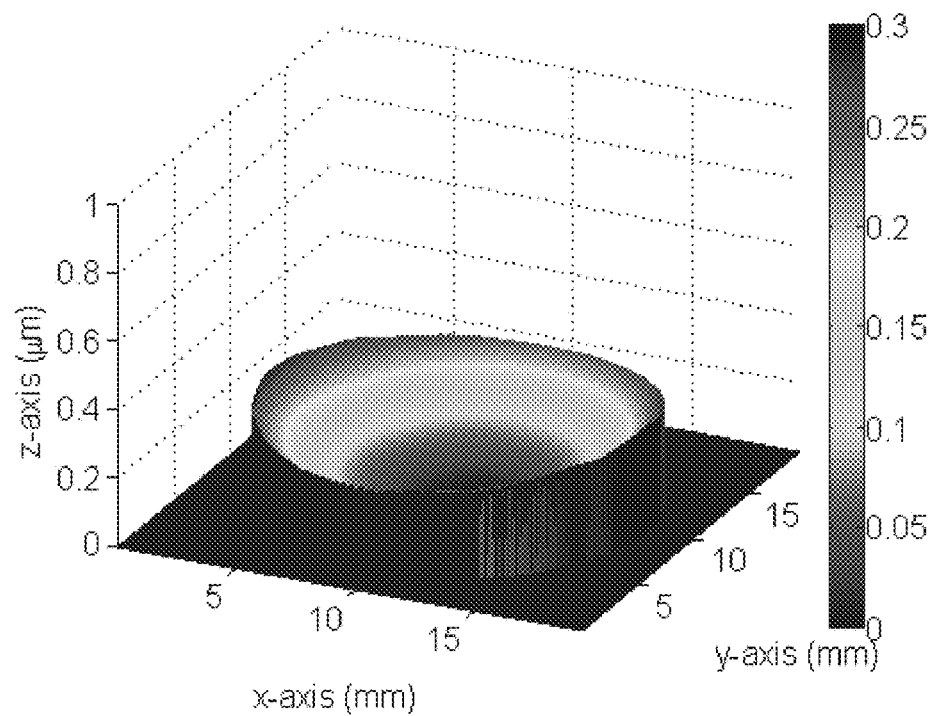
FIG. 7B shows a 3-D surface profile contour graph of the $MgF_2$ thin film formed on the surface of the substrate.

| Curvature radius calculated based on the 3-D surface profile contour graph of FIG. 7A (m) | Curvature radius calculated based on the 3-D surface profile contour graph of FIG. 7B (m) | Residual stress in the optical (MgF$_2$) thin film (GPa) |
|---|---|---|
| −285.563 ± 8.790 | −240.665 ± 2.196 | 0.363 ± 0.034 |

Figure 8A:
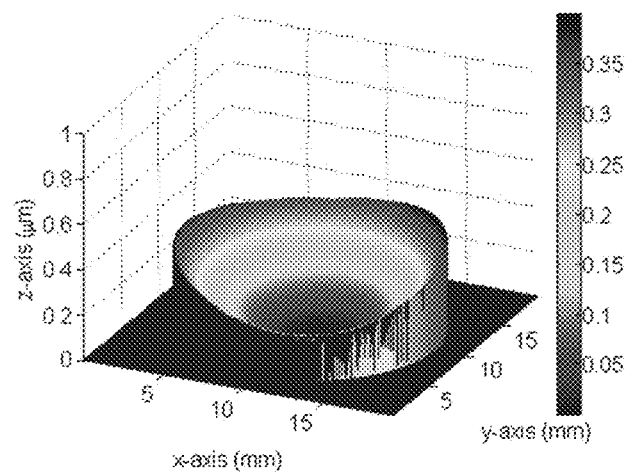
FIG. 8A shows a 3-D surface profile contour graph of background.
Figure 8B:
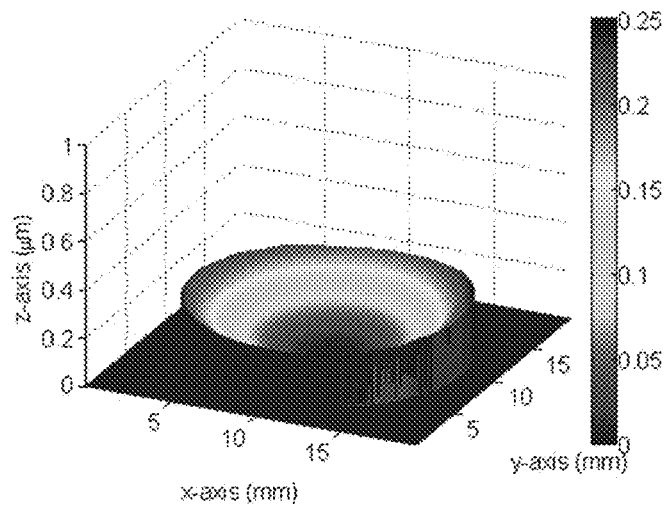
FIG. 8B shows a 3-D surface profile contour graph of the $MgF_2$ thin film.
Figure 8C:
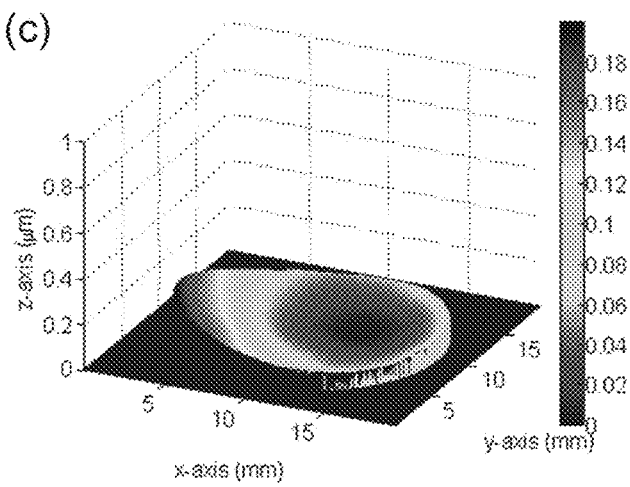
FIG. 8C shows a 3-D surface profile contour graph without containing background noise of the $MgF_2$ thin film.

Herein, it needs to further explain that both the two 3-D surface profile contour graphs of FIG. 7A and FIG. 7B have been treated with a background noise eliminating process. To eliminate the background noise, it needs to firstly use the system 1 of FIG. 3B to obtain a light interference pattern of background so as to establish a 3-D surface profile contour graph of background (as shown in FIG. 8A) under the laser source LS being disabled. Next, the system 1 of FIG. 3B is subsequently operated to obtain a second light interference pattern of the MgF$_2$ thin film so as to establish a 3-D surface profile contour graph of the MgF$_2$ thin film (as shown in FIG. 8B) in the case of the laser source LS being controlled to provide the laser beam. As a result, after applying a image (or background) subtraction process to the 3-D surface profile contour graph of the MgF$_2$ thin film and the 3-D surface profile contour graph of background, a 3-D surface profile contour graph (as shown in FIG. 8C) without containing background noise of the MgF$_2$ thin film is hence obtained.

Therefore, through above descriptions, all embodiments and their constituting elements of the system for measuring residual stress in optical thin films proposed by the present invention have been introduced completely and clearly; in summary, the present invention includes the advantages of:

(1) Conventional optical-transmission-type residual stress measuring apparatus cannot be used for completing the measurement of residual stress in an optical film having light reflective property, and conventional optical-reflection-type residual stress measuring apparatus is known failing to achieving the measurement of residual stress in an optical film having transparent or translucent property. In view of that, the present invention discloses a system 1 for measuring residual stress in optical thin films, which is able to be utilized for achieving the residual stress measurement of respective optical film having transparent or translucent property and that of respective optical film having light reflective property. Therefore, it is helpful for largely reducing both the purchase cost and the maintenance cost by only purchasing the residual stress measuring system provided by the present invention instead of simultaneously purchasing the aforesaid two different types of residual stress measuring apparatuses.

The above description is made on embodiments of the present invention. However, the embodiments are not intended to limit scope of the present invention, and all equivalent implementations or alterations within the spirit of the present invention still fall within the scope of the present invention.

What is claimed is:

1. A system for measuring residual stress in optical thin films, comprising:

a laser source;

a spatial filter, being configured for receiving a laser beam provided by the laser source, so as to apply a spatial filtering process to the laser beam;

a collimating lens module for converting the laser beam having been treated with the spatial filtering process to a plane-wave laser beam;

a first beam splitter module, being configured for receiving the plane-wave laser beam, and splitting the plane-wave laser beam into an initial reference beam and an initial test beam;

a test plate module for receiving the initial reference beam;

a sample carrying module, being used for carrying and supporting a test sample thereby making the test sample receive the initial test beam; wherein in the case of the test sample having high optical reflective property, the test plate module being configured for reflecting the initial reference beam and passes a first reference beam back to the first beam splitter module, and the test sample also reflecting the initial test beam and passing a first test beam back to the first beam splitter module;

a first screen, wherein the first beam splitter module combines the first test beam and the first reference beam to a first light beam, thereby projecting the first light beam onto the first screen, so as to form a first light interference pattern on the first screen;

a first image capturing module for capturing the first light interference pattern;

a reference plate, wherein in the case of the test sample having high transparent property, the initial test beam would pass through the test sample so as to be received by the reference plate, such that the reference plate reflects the initial test beam;

a second beam splitter module for receiving a second test beam passed from the reference plate; wherein in the case of the test sample having high transparent property, the test plate module being turned by a turning angle, such that the test plate module reflects the initial reference beam and passes a second reference beam to the second beam splitter module;

a second screen, wherein the second beam splitter module combines the second test beam and the second reference beam to a second light beam, thereby projecting the second light beam onto the second screen, so as to form a second light interference pattern on the second screen;

a second image capturing module for capturing the second light interference pattern; and at least one controlling and processing module, being electrically connected to the first image capturing module and the second image capturing module;

wherein the controlling and processing module calculates a first residual stress in the test sample having high optical reflective property by applying a first image processing to the first light interference pattern;

wherein the controlling and processing module calculates a second residual stress in the test sample having high transparent property by applying a second image processing to the first light interference pattern.

2. The system of claim 1, wherein the laser source is a helium-neon laser device.

3. The system of claim 1, wherein the turning angle is 45 degree.

4. The system of claim 1, wherein the spatial filter comprises:
   a pin hole unit, being disposed at a position of an objective lens focus; and
   a microscope objective lens unit for focusing the laser beam so as to make the laser beam pass through the pin hole unit.

5. The system of claim 1, wherein the collimating lens module comprises a double convex lens or a plano-convex lens.

6. The system of claim 1, further comprising an aperture module for applying a beam shaping process to the plane-wave laser beam.

7. The system of claim 1, wherein both the first screen and the second screen are a ground glass driven by a DC motor to rotate.

8. The system of claim 1, wherein both the first image capturing module and the second image capturing module are a camera device using charge-coupled device (CCD) image sensors.

9. The system of claim 1, wherein the controlling and processing module is selected from the group consisting of desk computer, laptop computer, tablet PC, and smart phone.

10. The system of claim 1, wherein the sample carrying module 16 comprises:
    a sample carrying unit for carrying the test sample thereby making the test sample receive the initial test beam; and
    a supporting unit for supporting the sample carrying unit.

11. The system of claim 1, wherein the sample carrying module is a robotic arm.

12. The system of claim 1, wherein the test plate module comprises:
    a base;
    a supporting post connected to the base by one end thereof; and
    a test plate, being connected to the other end of the rotary post;
    wherein there is a driving mechanism provided in the base for driving the supporting post to rotate the turning angle, so as to make the test plate be turned by the same angle;
    wherein a switch unit for triggering the driving mechanism is exposed on the surface of the base.

13. The system of claim 12, further comprising:
    a first linear motion platform for allowing the test plate to be putted thereon; wherein after the first linear motion platform is controlled by the controlling and processing module to execute several times of nanoscale motion, the controlling and processing module obtaining several image frames of the first light interference pattern from the first image capturing module so as to complete the first image processing; and
    a second linear motion platform for allowing the reference plate to be putted thereon; wherein after the second linear motion platform is controlled by the controlling and processing module to execute several times of nanoscale motion, the controlling and processing module obtaining several image frames of the second light interference pattern from the second image capturing module so as to achieve the second image processing;
    wherein the controlling and processing module completes the first image processing and the second image processing by using a phase-shifting interferometry (PSI) method.

14. The system of claim 13, wherein the PSI method is provided in a main processor of the controlling and processing module by a form of application program, library, variables, or operands.

15. The system of claim 12, further comprising:
    a first plane tilting platform for allowing the test plate to be disposed thereon; wherein after the first plane tilting platform is controlled by the controlling and processing module to apply at least one time of plane tilting process to the test plate, the controlling and processing module obtaining corresponding image frames of the first light interference pattern from the first image capturing module so as to complete the first image processing; and
    a second plane tilting platform for allowing the reference plate to be disposed thereon; wherein after the second plane tilting platform is controlled by the controlling and processing module to apply at least one time of plane tilting process to the reference plate, the controlling and processing module obtaining corresponding image frames of the second light interference pattern from the second image capturing module so as to achieve the second image processing;
    wherein the controlling and processing module completes the first image processing and the second image processing by using a Fast Fourier transform (FFT) method.

16. The system of claim 15, wherein the FFT method is provided in a main processor of the controlling and processing module by a form of application program, library, variables, or operands.

* * * * *